United States Patent
Kojima

(10) Patent No.: US 10,457,232 B2
(45) Date of Patent: Oct. 29, 2019

(54) VEHICLE SYSTEM

(71) Applicant: TOYOTA JIDOSHA KABUSHIKI KAISHA, Toyota-shi, Aichi-ken (JP)

(72) Inventor: Masaomi Kojima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 30 days.

(21) Appl. No.: 15/938,201

(22) Filed: Mar. 28, 2018

(65) Prior Publication Data

US 2018/0290606 A1    Oct. 11, 2018

(30) Foreign Application Priority Data

Apr. 5, 2017    (JP) .................. 2017-075486

(51) Int. Cl.
*B60R 16/03*    (2006.01)

(52) U.S. Cl.
CPC .................... *B60R 16/03* (2013.01)

(58) Field of Classification Search
CPC ..................................... B60R 16/03
See application file for complete search history.

(56) References Cited

U.S. PATENT DOCUMENTS

| | | | | |
|---|---|---|---|---|
| RE40,866 E | * | 8/2009 | Fung ..................... | G06F 1/3203 713/300 |
| 2002/0062454 A1 | * | 5/2002 | Fung ..................... | G06F 1/3203 713/300 |
| 2004/0039504 A1 | * | 2/2004 | Coffee ................... | B28C 5/422 701/482 |
| 2010/0241833 A1 | * | 9/2010 | Suzue .................... | G06F 9/5038 712/220 |
| 2010/0262971 A1 | * | 10/2010 | Yamada .................. | G06F 9/505 718/104 |
| 2012/0029747 A1 | * | 2/2012 | Katoh ..................... | B60R 16/03 701/22 |
| 2013/0339721 A1 | | 12/2013 | Yasuda | |
| 2014/0016648 A1 | * | 1/2014 | Hidaka ................... | H04L 49/15 370/400 |
| 2014/0095740 A1 | * | 4/2014 | Ozawa ................. | G06F 11/3034 710/18 |
| 2016/0020943 A1 | * | 1/2016 | Diab ..................... | H04L 67/327 714/4.12 |
| 2016/0109494 A1 | * | 4/2016 | Hanson ................ | G01R 21/127 324/103 R |
| 2016/0363980 A1 | * | 12/2016 | Spiel ...................... | G06F 1/3206 |
| 2017/0132144 A1 | * | 5/2017 | Solihin ............... | G06F 12/0893 |

FOREIGN PATENT DOCUMENTS

| | | | |
|---|---|---|---|
| DE | 19514738 A1 | * 10/1995 | ............... H02J 1/14 |
| JP | 2012-178035 A | 9/2012 | |

* cited by examiner

*Primary Examiner* — Alex C Dunn
(74) *Attorney, Agent, or Firm* — Sughrue Mion, PLLC

(57) ABSTRACT

A vehicle system includes a main control electronic control unit configured to acquire an operating rate of each of a plurality of applications arranged in at least one of a plurality of electronic control units, calculate a plurality of arrangement patterns in which the applications are arranged in the electronic control units, calculate, based on the operating rate of each of the applications, a total electric power consumption of the electronic control units when each of the arrangement patterns is implemented, and arrange the applications in at least one of the electronic control units in the arrangement pattern that has the least total electric power consumption among the arrangement patterns.

7 Claims, 14 Drawing Sheets

| OPERATING CONDITION (EXAMPLE) | OPERATING RATE (INITIAL VALUE) |
|---|---|
| OPERATED AT ALL TIMES | 100% |
| WHEN ACCESSORY ELECTRIC POWER IS SUPPLIED | 30% |
| WHEN IG IS ON | 25% |
| WHEN HEADLAMP IS ON | 7.5% |
| WHEN PASSENGER SEAT IS OCCUPIED | 2.5% |
| WHEN ABS IS OPERATED | $0.475 \times 10^{-7}$% |

FIG. 13A

INITIAL STATE

| ECU | RATED ELECTRIC POWER CONSUMPTION | APPLICATION A (100%) | APPLICATION B (30%) | APPLICATION C (7.5%) | APPLICATION D (25%) | OPERATING RATE | ELECTRIC POWER CONSUMPTION |
|---|---|---|---|---|---|---|---|
| 1 | 30 | O | O | | | 100% | 30 |
| 2 | 20 | | | O | O | 25% | 5 |
| 3 | 22 | | | | | 0% | 0 |

TOTAL ELECTRIC POWER CONSUMPTION = 35 W

PATTERN 1

| 1 | 30 | O | O | | | 100% | 30 |
|---|---|---|---|---|---|---|---|
| 2 | 20 | | | O | | 7.5% | 1.5 |
| 3 | 22 | | | | O | 25% | 5.5 |

TOTAL ELECTRIC POWER CONSUMPTION = 37 W

PATTERN 2

| 1 | 30 | O | O | | | 100% | 30 |
|---|---|---|---|---|---|---|---|
| 2 | 20 | | | | O | 25% | 5 |
| 3 | 22 | | | O | | 7.5% | 1.65 |

TOTAL ELECTRIC POWER CONSUMPTION = 36.65 W

PATTERN 3

| 1 | 30 | O | O | | | 100% | 30 |
|---|---|---|---|---|---|---|---|
| 2 | 20 | | | | | 0% | 0 |
| 3 | 22 | | | O | O | 25% | 5.5 |

TOTAL ELECTRIC POWER CONSUMPTION = 35.5 W

PATTERN 4

| 1 | 30 | O | | | O | 100% | 30 |
|---|---|---|---|---|---|---|---|
| 2 | 20 | | O | | | 30% | 6 |
| 3 | 22 | | | O | | 7.5% | 1.65 |

TOTAL ELECTRIC POWER CONSUMPTION = 37.65 W

PATTERN 5

| 1 | 30 | O | | | | 100% | 30 |
|---|---|---|---|---|---|---|---|
| 2 | 20 | | O | | O | 30% | 6 |
| 3 | 22 | | | O | | 7.5% | 1.65 |

TOTAL ELECTRIC POWER CONSUMPTION = 37.65 W

FIG. 13B

PATTERN 6

|   |    |   |   |   |   |      |    |
|---|----|---|---|---|---|------|----|
| 1 | 30 | O |   |   |   | 100% | 30 |
| 2 | 20 |   | O |   |   | 30%  | 6  |
| 3 | 22 |   |   | O | O | 25%  | 5.5|

TOTAL ELECTRIC POWER CONSUMPTION = 41.5 W

PATTERN 7

|   |    |   |   |   |   |      |    |
|---|----|---|---|---|---|------|----|
| 1 | 30 | O |   |   | O | 100% | 30 |
| 2 | 20 |   |   | O |   | 7.5% | 1.5|
| 3 | 22 |   | O |   |   | 30%  | 6.6|

TOTAL ELECTRIC POWER CONSUMPTION = 38.1 W

PATTERN 8

|   |    |   |   |   |   |      |    |
|---|----|---|---|---|---|------|----|
| 1 | 30 | O |   |   |   | 100% | 30 |
| 2 | 20 |   |   | O | O | 25%  | 5  |
| 3 | 22 |   | O |   |   | 30%  | 6.6|

TOTAL ELECTRIC POWER CONSUMPTION = 41.6 W

PATTERN 9

|   |    |   |   |   |   |      |    |
|---|----|---|---|---|---|------|----|
| 1 | 30 | O |   |   |   | 100% | 30 |
| 2 | 20 |   |   | O |   | 7.5% | 1.5|
| 3 | 22 |   |   | O | O | 30%  | 6.6|

TOTAL ELECTRIC POWER CONSUMPTION = 38.1 W

PATTERN 10

|   |    |   |   |   |   |      |    |
|---|----|---|---|---|---|------|----|
| 1 | 30 |   |   | O | O | 30%  | 9  |
| 2 | 20 |   | O |   |   | 100% | 20 |
| 3 | 22 |   |   |   |   | 0%   | 0  |

TOTAL ELECTRIC POWER CONSUMPTION = 29 W

PATTERN 11

|   |    |   |   |   |   |      |    |
|---|----|---|---|---|---|------|----|
| 1 | 30 |   |   | O | O | 30%  | 9  |
| 2 | 20 |   | O |   |   | 100% | 20 |
| 3 | 22 |   |   |   | O | 25%  | 5.5|

TOTAL ELECTRIC POWER CONSUMPTION = 34.5 W

PATTERN 12

|   |    |   |   |   |   |      |    |
|---|----|---|---|---|---|------|----|
| 1 | 30 |   |   | O |   | 30%  | 9  |
| 2 | 20 |   | O |   |   | 100% | 20 |
| 3 | 22 |   |   |   | O | 7.5% | 1.65|

TOTAL ELECTRIC POWER CONSUMPTION = 30.65 W

FIG. 13C

PATTERN 13

| | | | | | | | |
|---|---|---|---|---|---|---|---|
| 1 | 30 | | ○ | | | 30% | 9 |
| 2 | 20 | ○ | | | ○ | 100% | 20 |
| 3 | 22 | | | ○ | | 7.5% | 1.65 |

TOTAL ELECTRIC POWER CONSUMPTION = 30.65 W

PATTERN 14

| | | | | | | | |
|---|---|---|---|---|---|---|---|
| 1 | 30 | | ○ | | | 30% | 9 |
| 2 | 20 | ○ | | | | 100% | 20 |
| 3 | 22 | | | ○ | ○ | 25% | 5.5 |

TOTAL ELECTRIC POWER CONSUMPTION = 34.5 W

PATTERN 15

| | | | | | | | |
|---|---|---|---|---|---|---|---|
| 1 | 30 | | | ○ | ○ | 25% | 7.5 |
| 2 | 20 | ○ | ○ | | | 100% | 20 |
| 3 | 22 | | | | | 0% | 0 |

TOTAL ELECTRIC POWER CONSUMPTION = 27.5 W

PATTERN 16

| | | | | | | | |
|---|---|---|---|---|---|---|---|
| 1 | 30 | | | ○ | | 7.5% | 2.25 |
| 2 | 20 | ○ | ○ | | | 100% | 20 |
| 3 | 22 | | | | ○ | 25% | 5.5 |

TOTAL ELECTRIC POWER CONSUMPTION = 27.75 W

PATTERN 17

| | | | | | | | |
|---|---|---|---|---|---|---|---|
| 1 | 30 | | | | ○ | 25% | 7.5 |
| 2 | 20 | ○ | ○ | | | 100% | 20 |
| 3 | 22 | | | ○ | | 7.5% | 1.65 |

TOTAL ELECTRIC POWER CONSUMPTION = 29.15 W

PATTERN 18

| | | | | | | | |
|---|---|---|---|---|---|---|---|
| 1 | 30 | | | | | 0% | 0 |
| 2 | 20 | ○ | ○ | | | 100% | 20 |
| 3 | 22 | | | ○ | ○ | 25% | 5.5 |

TOTAL ELECTRIC POWER CONSUMPTION = 25.5 W

VEHICLE SYSTEM

INCORPORATION BY REFERENCE

The disclosure of Japanese Patent Application No. 2017-075486 filed on Apr. 5, 2017 including the specification, drawings and abstract is incorporated herein by reference in its entirety.

BACKGROUND

1. Technical Field

The present disclosure relates to a technical field of a vehicle system including a plurality of electronic control units (ECU) in which a plurality of applications can be arranged.

2. Description of Related Art

A vehicle is known to include a plurality of electronic control units (ECU) capable of communicating with each other. In such a vehicle, specific functions are realized by arranging applications (software) in each ECU. For example, each ECU in which applications are to be arranged is selected by considering data flow and the like in an in-vehicle network (for example, refer to Japanese Unexamined Patent Application Publication No. 2012-178035 (JP 2012-178035 A)).

SUMMARY

The technology disclosed in JP 2012-178035 A does not consider the operating rate of each application (in other words, the ratio of a time period in which electric power is supplied, to a time period in which electric power is not supplied). Thus, the electric power consumption of the ECUs may be needlessly increased as the applications are arranged.

Specifically, each ECU needs to continue supplying electric power in accordance with the application that has the highest operating rate among the arranged applications. Thus, even the ECU in which a number of applications having a relatively low operating rate are arranged may have a significant increase in electric power consumption by arranging one application having a relatively high operating rate in the ECU.

The present disclosure provides a vehicle system that can suitably reduce an electric power consumption for a vehicle including a plurality of electronic control units.

A first aspect of the present disclosure relates to a vehicle system that includes a plurality of electronic control units. The vehicle system includes a main control electronic control unit configured to acquire an operating rate of each of a plurality of applications arranged in at least one of the electronic control units, calculate a plurality of arrangement patterns in which the applications are arranged in the electronic control units, calculate, based on the operating rate of each of the applications, a total electric power consumption of the electronic control units when each of the arrangement patterns is implemented, and arrange the applications in at least one of the electronic control units in the arrangement pattern that has the least total electric power consumption among the arrangement patterns.

The vehicle system according to the first aspect of the present disclosure calculates the total electric power consumption of the electronic control units (that is, the total value of the electric power consumption of each of the electronic control units) for each of the arrangement patterns that may be implemented when the applications are arranged in the electronic control units. The electric power consumption of each of the electronic control units is a value that is calculated based on the operating rate of each arranged application. For example, the electric power consumption of each of the electronic control units can be calculated by multiplying a rated electric power consumption of each electronic control unit by the operating rate of the application that has the highest operating rate among the arranged applications.

When the total electric power consumption is calculated, the applications are arranged (rearranged when already arranged) in the arrangement pattern that has the least total electric power consumption among the arrangement patterns. Accordingly, when the total electric power consumption calculated based on the operating rate of each application is used, a needless increase in the electric power consumption of each electronic control unit caused by a part of the applications having a high operating rate can be suppressed, and the electric power consumption of the entire system can be suitably reduced.

In the vehicle system according to the first aspect of the present disclosure, the main control electronic control unit may be configured to calculate the arrangement patterns when a new electronic control unit is added to the vehicle system.

When a new electronic control unit is added, the total electric power consumption may be increased along with an increase in the number of electronic control units, but applications can also be arranged in the added electronic control unit (in other words, the number of application arrangement patterns is increased). Thus, when the arrangement patterns are calculated in such a case, an increase in electric power consumption caused by addition of the electronic control unit can be suppressed. According to conditions, the electric power consumption can be decreased further than before the electronic control unit is added.

In the vehicle system according to the first aspect of the present disclosure, the main control electronic control unit may be configured to calculate the arrangement patterns when a new application is added to the vehicle system.

When a new application is added, the electric power consumption of the electronic control units may be increased according to the operating rate of each application. According to the capacity of each application, the arrangement of the applications may have to be changed. Thus, when the arrangement patterns are calculated in such a case, an increase in electric power consumption caused by the addition of the application can be suppressed by implementing an appropriate arrangement pattern.

In the vehicle system according to the first aspect of the present disclosure, the main control electronic control unit may be configured to calculate the arrangement patterns when a new output unit configured to output information to be used by an application arranged in the electronic control units is added to the vehicle system.

When a new output unit (for example, a sensor) is added, the operating rate of the application that uses the information output from the added output unit is changed, and consequently, the total electric power consumption may be increased. Thus, when the arrangement patterns are calculated in such a case, an increase in electric power consumption caused by the addition of the output unit can be suppressed.

In the vehicle system according to the first aspect of the present disclosure, the main control electronic control unit may be configured to learn and update the operating rate of each of the applications.

According to the first aspect of the present disclosure, the operating rate of each application is updated to the most recent value by learning. Thus, the total electric power consumption can be accurately calculated, and the electric power consumption can be more suitably reduced.

In the vehicle system according to the first aspect of the present disclosure, the main control electronic control unit may be configured to monitor the operating rate of each of the applications and appropriately update the operating rate.

A second aspect of the present disclosure relates to a vehicle system. The vehicle system includes an electric power distribution unit, a battery that is connected to the electric power distribution unit, a main control electronic control unit that is connected to the electric power distribution unit, and a plurality of electronic control units that is connected to the electric power distribution unit. The electric power distribution unit is configured to supply electric power of the battery to the electronic control units and the main control electronic control unit. The main control electronic control unit is configured to acquire an operating rate of each of a plurality of applications arranged in at least one of the electronic control units, calculate a plurality of arrangement patterns in which the applications are arranged in the electronic control units, calculate, based on the operating rate of each of the applications, a total electric power consumption of the electronic control units when each of the arrangement patterns is implemented, and arrange the applications in at least one of the electronic control units in the arrangement pattern that has the least total electric power consumption among the arrangement patterns.

The effects and other advantages of the present disclosure will become apparent from embodiments described below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13A is a table illustrating one example of arrangement patterns calculated in an arrangement pattern calculation control;

FIG. 13B is a table illustrating one example of arrangement patterns calculated in an arrangement pattern calculation control;

FIG. 13C is a table illustrating one example of arrangement patterns calculated in an arrangement pattern calculation control.

DETAILED DESCRIPTION OF EMBODIMENTS

An embodiment according to a vehicle system of the present disclosure will be described based on the drawings.

Configuration of Vehicle System

Figures 1, 2:
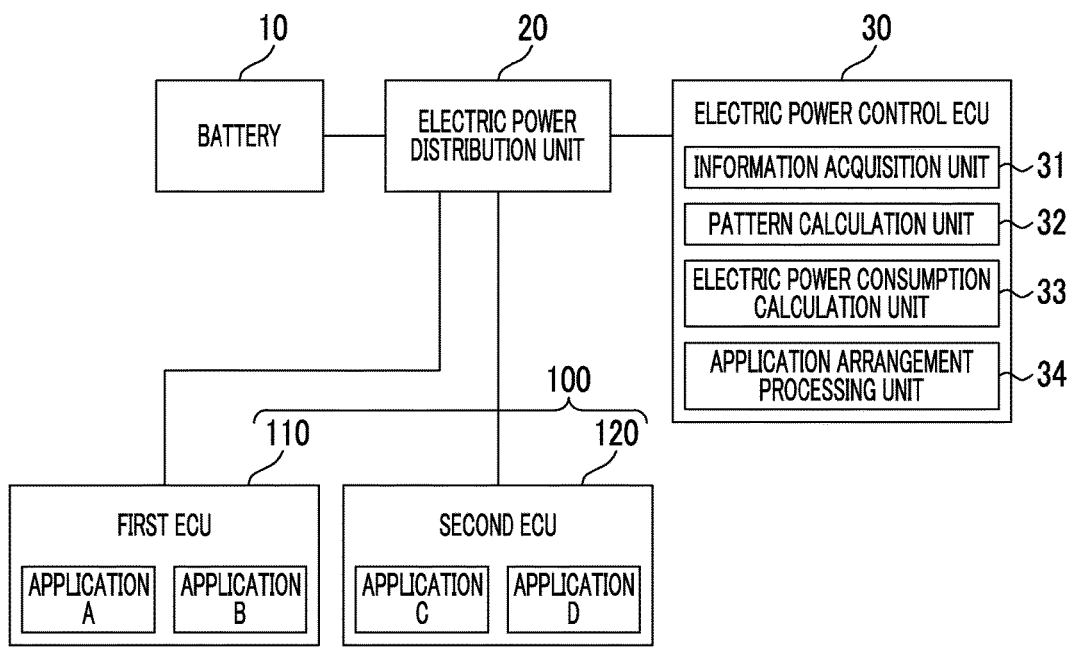
FIG. 1 is a block diagram illustrating a configuration of a vehicle system according to an embodiment.
FIG. 2 is a table illustrating one example of an operating condition and an operating rate of an application.

A configuration of a vehicle system according to the embodiment will be described with reference to FIG. 1. FIG. 1 is a block diagram illustrating a configuration of the vehicle system according to the embodiment.

In FIG. 1, the vehicle system according to the present embodiment is mounted in a vehicle such as an automobile, and is configured to include a battery 10, an electric power distribution unit 20, an electric power control electronic control unit (electric power control ECU) 30, a first electronic control unit (first ECU) 110, and a second electronic control unit (second ECU) 120.

The battery 10 is configured as a secondary battery such as a lithium ion battery, and functions as a main electric power source of the vehicle system according to the embodiment. The battery 10 is connected to the electric power distribution unit 20 and is configured to be capable of supplying electric power to each unit of the vehicle system through the electric power distribution unit 20. The electric power control ECU 30 controls operation of the electric power distribution unit 20.

The electric power control ECU 30 is a control unit having a calculation circuit such as a central processing unit (CPU), and is configured to be capable of supplying electric power to the first ECU 110 and the second ECU 120 connected to the electric power distribution unit 20 at an appropriate timing by controlling the electric power distribution unit 20. That is, the electric power control ECU 30 manages the electric power timing of each of the first ECU 110 and the second ECU 120 (that is, a timing at which the electric power supply is ON, and a timing at which the electric power supply is OFF). The electric power control ECU is one example of a main control electronic control unit.

The electric power control ECU 30 is configured to be capable of executing a process of rearranging a plurality of applications arranged in the first ECU 110 and the second ECU 120. The electric power control ECU 30 includes, as a logical or physical processing block for executing such a process, an information acquisition unit 31 as a specific example of "acquisition means", a pattern calculation unit 32 as a specific example of "pattern calculation means", an electric power consumption calculation unit 33 as a specific example of "electric power consumption calculation means", and an application arrangement processing unit 34 as a specific example of "arrangement means". Operation of the information acquisition unit 31, the pattern calculation unit 32, the electric power consumption calculation unit 33, and the application arrangement processing unit 34 will be described in detail below.

The first ECU 110 and the second ECU 120 (hereinafter, collectively referred to as "ECU 100") are configured to be capable of realizing various functions in the vehicle by executing the arranged applications (that is, applications A to D in FIG. 1). The first ECU 110 and the second ECU 120 are configured to be not only capable of exchanging electric power but also capable of communicating with each other through the electric power distribution unit 20. While illustration is omitted, the first ECU 110 and the second ECU 120 are connected to various actuators (for example, an accelerator actuator and a steering actuator) and are configured to be capable of controlling operation of various actuators by executing the arranged applications. At least one of the first ECU 110 and the second ECU 120 may be capable of executing any operation related to traveling of the vehicle without controlling the operation of the actuators, in addition to or instead of controlling the operation of the actuators. Examples of such an operation include an operation related to control of a motor generator that is one example of a drive device of the vehicle, an operation related to a navigation device included in the vehicle, and an operation that needs to be performed by the ECU for traveling of the vehicle and does not need control of the actuators included in the vehicle.

Electric Power Consumption of Electronic Control Unit (ECU)

Figure 3:
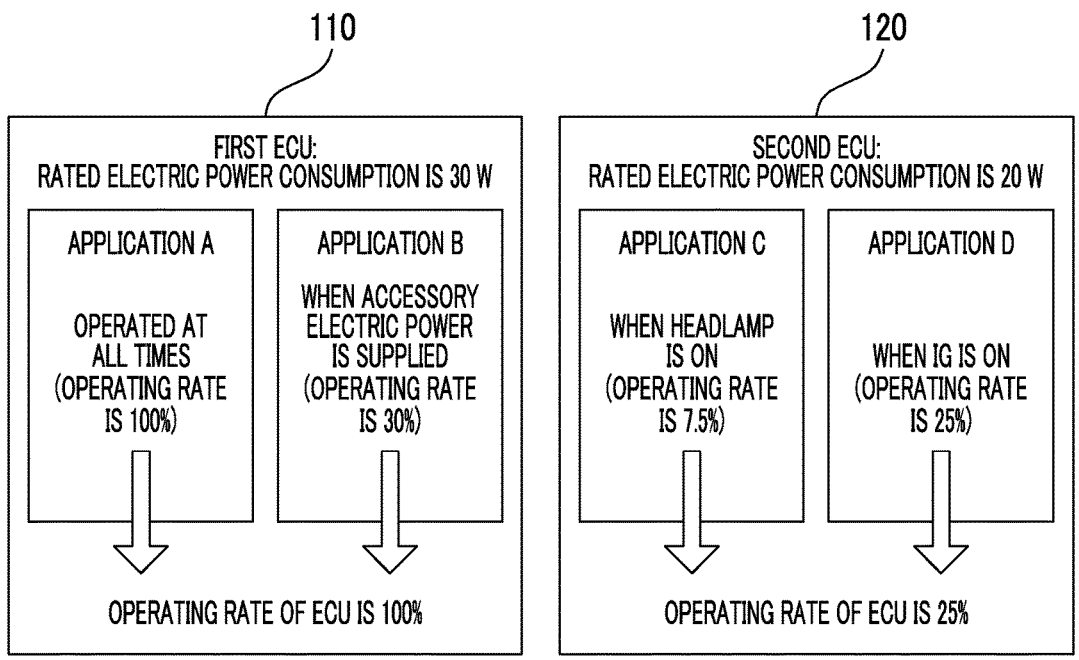
FIG. 3 is a conceptual diagram (1) illustrating a method of calculating the total electric power consumption in an electronic control unit.
Figure 4:
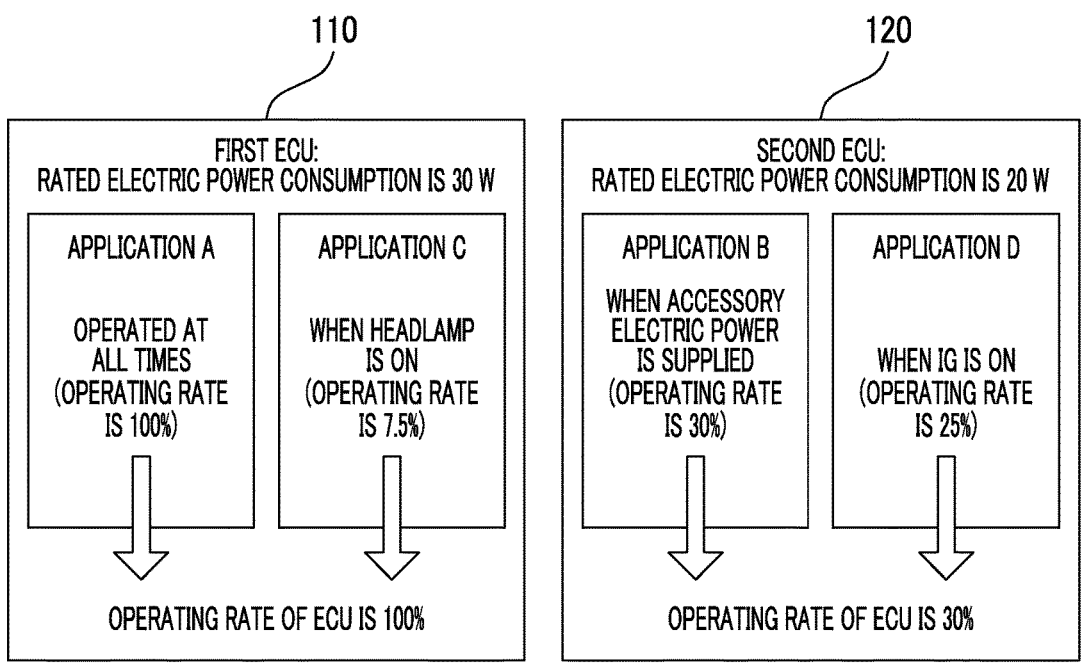
FIG. 4 is a conceptual diagram (2) illustrating a method of calculating the total electric power consumption in the electronic control unit.

The electric power consumption of the ECU 100 (that is, the first ECU 110, the second ECU 120, and the like in FIG. 1) will be specifically described with reference to FIG. 2 to FIG. 4. FIG. 2 is a table illustrating one example of the operating condition and the operating rate of an application. FIG. 3 is a conceptual diagram (1) illustrating a method of calculating the total electric power consumption in the ECU. FIG. 4 is a conceptual diagram (2) illustrating a method of calculating the total electric power consumption in the ECU.

The electric power consumption of the ECU 100 is changed according to the operating time period. That is, as the operating time period is increased, the electric power consumption is increased. As the operating time period is decreased, the electric power consumption is decreased. Particularly, the operating time period of the ECU 100 is determined in accordance with the operating rate of each arranged application (that is, the ratio of a time period in which electric power is supplied, to a time period in which electric power is not supplied). Specifically, the ECU 100 is operated in accordance with the operating rate of the application that has the highest operating rate among the arranged applications.

As illustrated in FIG. 2, the operating condition of each application is determined in advance, and the operating rate can be estimated in accordance with the operating condition. For example, the operating rate of an application having an operating condition of "operated at all times" may be set to 100%. The operating rate of an application having an operating condition of "when accessory electric power is supplied" may be set to 30%. The operating rate of an application having an operating condition of "when ignition (IG) is ON" may be set to 25%. The operating rate of an application having an operating condition of "when headlamp is ON" may be set to 7.5%. The operating rate of an application having an operating condition of "when passenger seat is occupied" may be set to 2.5%. The operating rate of an application having an operating condition of "when antilock brake system (ABS) is operated" may be set to $0.475 \times 10^{-7}\%$.

The value of each operating rate is tentatively set as an initial value and may be subsequently changed by learning and the like. Specifically, the actual operating rate of each application may be monitored, and the operating rate may be appropriately updated. Accordingly, the electric power consumption can be calculated using the accurate operating rate, and the accuracy of the process described below can be increased. For example, the learning is performed by the electric power control ECU 30.

For example, the electric power consumption in a case where the application A and the application B are arranged in the first ECU 110, and where the application C and the application D are arranged in the second ECU 120 as illustrated in FIG. 3 is considered. Since the application A having an operating condition of "operated at all times" (that is, the operating rate is 100%) and the application B having an operating condition of "when accessory electric power is supplied" (that is, the operating rate is 30%) are arranged in the first ECU 110, the operating rate of the first ECU 110 is 100% corresponding to the operating rate of the application A that has the highest operating rate of the application A and the application B. Since the application C having an operating condition of "when headlamp is ON" (that is, the operating rate is 7.5%) and the application D having an operating condition of "when IG is ON" (that is, the operating rate is 25%) are arranged in the second ECU 120, the operating rate of the second ECU 120 is 25% corresponding to the operating rate of the application D that has the highest operating rate of the application C and the application D.

The total electric power consumption of the first ECU 110 and the second ECU 120 (that is, the total value of electric power consumed in the first ECU 110 and the second ECU 120 per predetermined unit time period) can be calculated as the sum of the electric power consumption of each ECU 100 that is calculated by multiplying the rated electric power consumption of each of the first ECU 110 and the second ECU 120 by the operating rate thereof. Specifically, the electric power consumption of the first ECU 110 is 30 W that is acquired by multiplying a rated electric power consumption of 30 W by an operating rate of 100%. The electric power consumption of the second ECU 120 is 5 W that is acquired by multiplying a rated electric power consumption of 20 W by an operating rate of 25%. Thus, the total electric power consumption of the first ECU 110 and the second ECU 120 is 30+5=35 W.

For example, the total electric power consumption can also be calculated using General Formula (1).

$$P = \sum_{n=1}^{Ne} \{RateMax(n) * Pe(n)\} \tag{1}$$

The total electric power consumption is denoted by P. The number of ECUs 100 is denoted by Ne. The rated electric power consumption of the n-th ECU is denoted by Pe(n). The operating rate of the application that has the highest operating rate among the applications arranged in the n-th ECU is denoted by RateMax(n).

The electric power consumption in a case where the application A and the application C are arranged in the first ECU 110, and where the application B and the application D are arranged in the second ECU 120 as illustrated in FIG. 4 is considered. Since the application A having an operating condition of "operated at all times" (that is, the operating rate is 100%) and the application C having an operating condition of "when headlamp is ON" (that is, the operating rate is 7.5%) are arranged in the first ECU 110, the operating rate of the first ECU 110 is 100% corresponding to the operating rate of the application A that has the highest operating rate of the application A and the application C. Since the application B having an operating condition of "when accessory electric power is supplied" (that is, the operating rate is 30%) and the application D having an operating condition of "when IG is ON" (that is, the operating rate is 25%) are arranged in the second ECU 120, the operating rate of the second ECU 120 is 30% corresponding to the operating rate of the application B that has the highest operating rate of the application B and the application D.

When the total electric power consumption is calculated in the same manner under such a condition, the electric power consumption of the first ECU 110 is 30 W that is acquired by multiplying a rated electric power consumption of 30 W by an operating rate of 100%. The electric power consumption of the second ECU 120 is 6 W that is acquired by multiplying a rated electric power consumption of 20 W by an operating rate of 30%. Thus, the total electric power consumption of the first ECU 110 and the second ECU 120 is 30+6=36 W.

As is understood from comparison between the calculation results in FIG. 3 and FIG. 4, the total electric power consumption of the first ECU 110 and the second ECU 120 is changed according to the arrangement of applications in each ECU 100 even when the applications to be arranged are not changed. Thus, when applications are appropriately arranged, the total electric power consumption can be reduced (in other words, when applications are not appropriately arranged, the total electric power consumption may be increased).

When applications are appropriately arranged at the beginning, the total electric power consumption can be minimized on the assumption that the system configuration is not changed. However, when the system configuration is changed on the way, the arrangement of applications for minimizing the total electric power consumption is also changed. Thus, the total electric power consumption cannot be minimized when the arrangement of applications is not changed according to situations.

Example of Change in System Configuration

Figure 5:
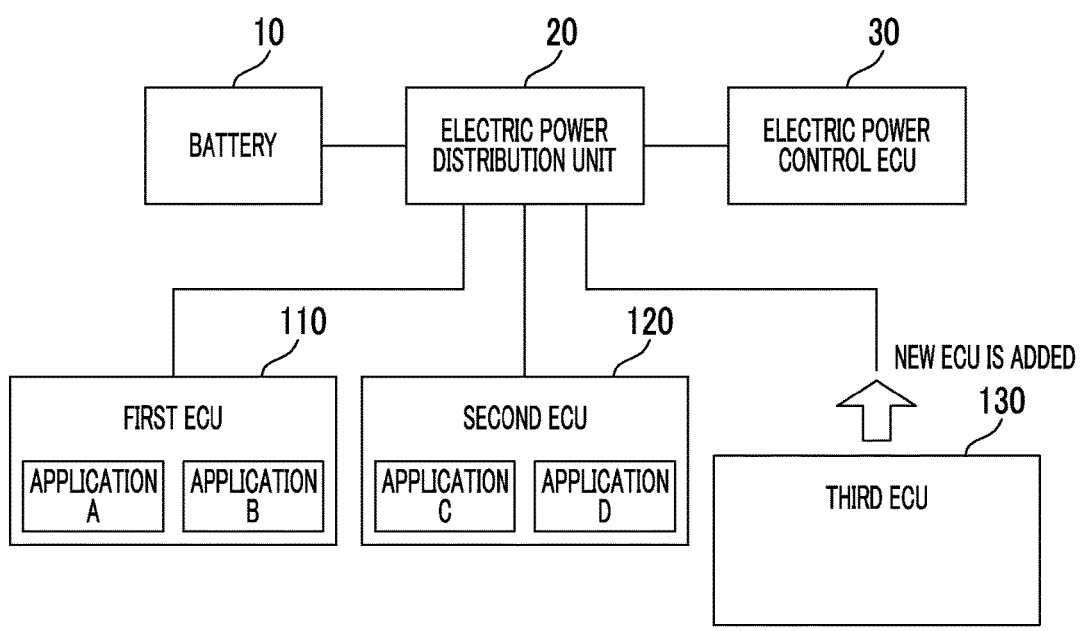
FIG. 5 is a conceptual diagram illustrating addition of a new electronic control unit to the vehicle system according to the embodiment.
Figure 6:
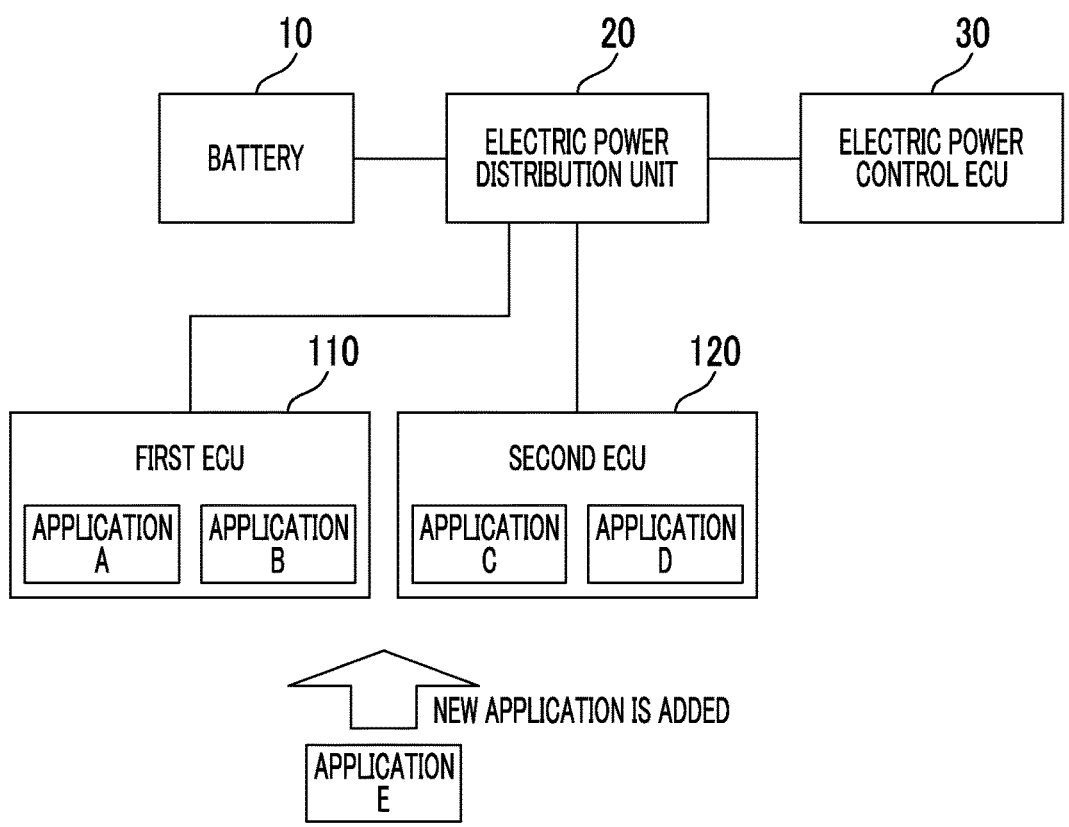
FIG. 6 is a conceptual diagram illustrating addition of a new application to the vehicle system according to the embodiment.
Figure 7:
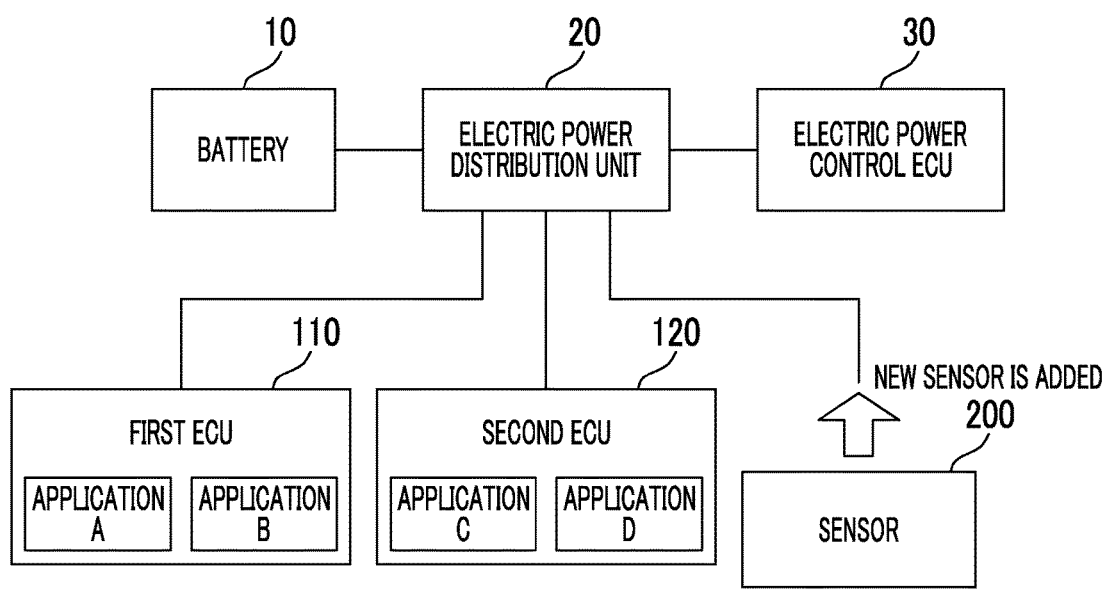
FIG. 7 is a conceptual diagram illustrating addition of a new sensor to the vehicle system according to the embodiment.

Hereinafter, an example of a change in system configuration where the arrangement of applications needs to be changed will be specifically described with reference to FIG. 5 to FIG. 7. FIG. 5 is a conceptual diagram illustrating addition of a new electronic control unit (ECU) to the vehicle system according to the embodiment. FIG. 6 is a conceptual diagram illustrating addition of a new application to the vehicle system according to the embodiment. FIG. 7 is a conceptual diagram illustrating addition of a new sensor to the vehicle system according to the embodiment.

(1) When a New Electronic Control Unit (ECU) is Added

In the example illustrated in FIG. 5, a third ECU 130 is added as a new ECU 100 connected to the electric power distribution unit 20. In such a case, since the number of ECUs 100 is increased in the vehicle system, the total electric power consumption is considered to be increased. However, the increase in the number of ECUs 100 leads to an increase in the number of places where the applications may be arranged (in the example illustrated in FIG. 5, applications can also be arranged in the third ECU 130). Thus, an application arrangement pattern for minimizing the total electric power consumption may be changed.

(2) When a New Application is Added

In the example illustrated in FIG. 6, an application E is added as a new application that needs to be arranged in the ECUs 100. For example, a new application is acquired using a communication device of the vehicle from a center outside the vehicle. In such a case, according to the operating rate of the application E, the operating rate of the ECU 100 in which the application E is arranged may be increased, and consequently, the total electric power consumption may be increased. Thus, the application arrangement pattern needs to be optimally changed in order to minimize the total electric power consumption.

(3) When a New Sensor is Added

In the example illustrated in FIG. 7, a sensor 200 that is a new member is connected to the electric power distribution unit 20. Particularly, the sensor 200 is configured to detect information to be used in operation of the applications arranged in the ECUs 100 and provide the information (in other words, output the information). Thus, addition of the sensor 200 may need a change in the operating condition (in other words, the operating rate) of each application. In such a case, the application arrangement pattern for minimizing the total electric power consumption may be changed.

The same applies to not only the new sensor 200 but also when any new information provision device that provides information to be used in at least one of the applications arranged in the ECUs 100 is connected to the vehicle system. One example of the information output device is a reception device that can receive information from an external server or a road-side device capable of communicating with the vehicle or the vehicle system, and provide the information to each ECU 100.

When the system configuration is changed as in the example, the arrangement of applications for minimizing the total electric power consumption is also changed. In order to deal with such a situation, the vehicle system according to the present embodiment executes a process of calculating a new application arrangement pattern (that is, an arrangement pattern for minimizing the total electric power consumption after a change in system configuration) when the system configuration is changed.

Method of Adding New Hardware

A method of adding hardware (that is, the ECU 100, the sensor 200, and the like) to the vehicle system according to the embodiment will be specifically described with reference to FIG. 8 to FIG. 10.

Figure 8:
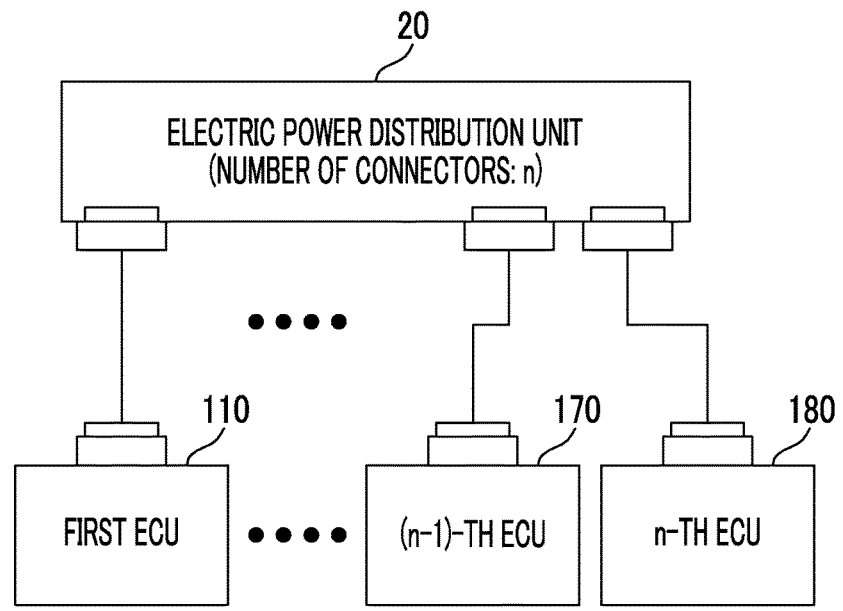
FIG. 8 is a configuration diagram illustrating an electric power distribution unit in which all connectors are occupied.

As illustrated in FIG. 8, when n ECUs 100 are already connected to (n) connectors of the electric power distribution unit 20, a new ECU 100 or the sensor 200 cannot be simply added since all connectors are occupied. In order to resolve such a case, it is considered that the electric power distribution unit 20 is added, or that the electric power distribution unit 20 is replaced to have more connectors. However, the cost of addition or replacement is relatively high.

Figure 9:
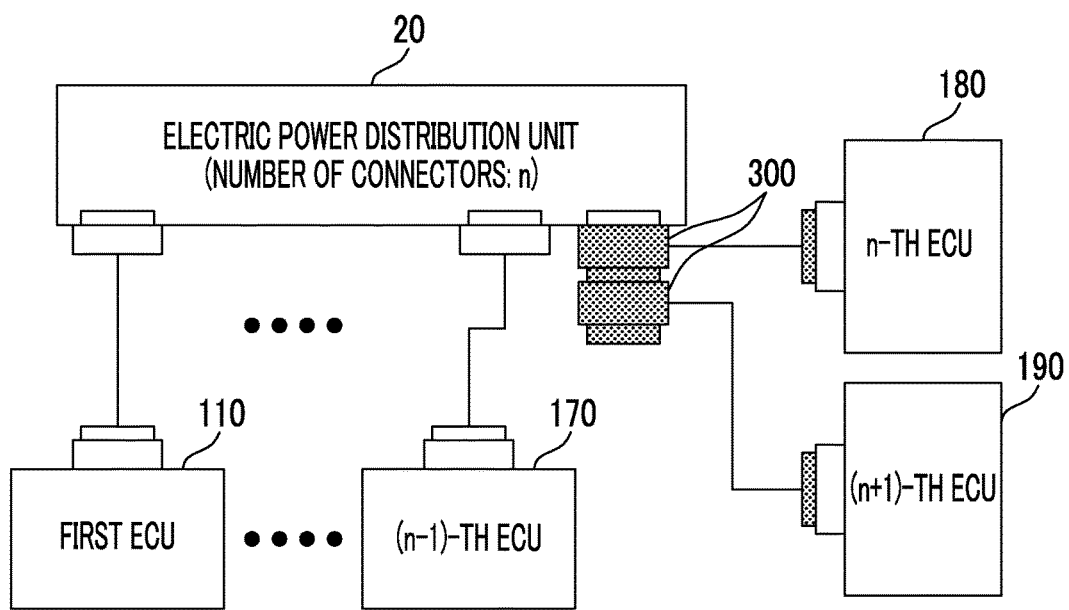
FIG. 9 is a configuration diagram illustrating an electric power distribution unit to which a new electronic control unit is added using an extension connector.

When an extension connector 300 is used as illustrated in FIG. 9, new hardware can be added relatively simply. In the example illustrated in FIG. 9, two extension connectors 300 are connected to the n-th connector where an n-th ECU 180 is connected. In such a case, not only the n-th ECU 180 but also an (n+1)-th ECU 190 can be connected to the n-th connector. Adding another hardware may be accomplished by simply increasing the number of extension connectors 300.

Figure 10:
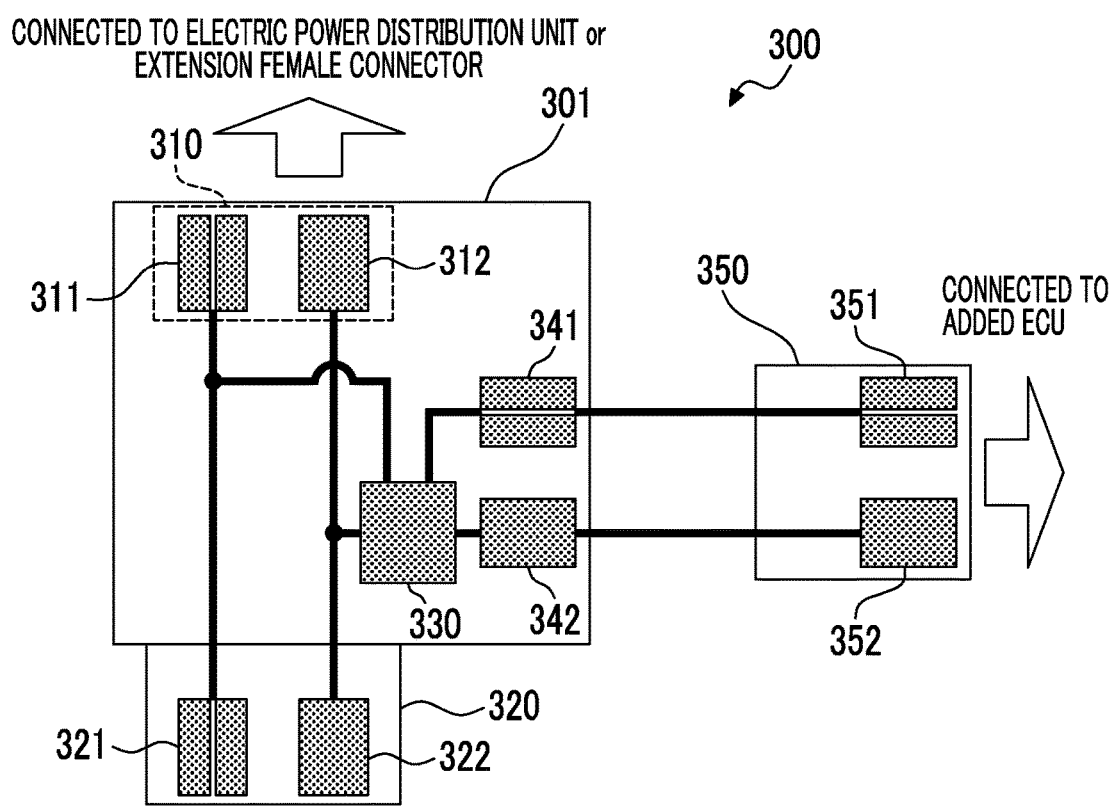
FIG. 10 is a circuit diagram illustrating a configuration of the extension connector.

As illustrated in FIG. 10, each extension connector 300 is configured to include a main body portion 301 and an ECU connector 350 connected to the main body portion 301.

An extension male connector 310 configured with a first communication line male terminal 311 and a first electric power line male terminal 312, and an extension female connector 320 configured with a first communication line female terminal 321 and a first electric power line female terminal 322 are arranged in the main body portion 301. The first communication line female terminal 321 is connected to the first communication line male terminal 311. The first electric power line female terminal 322 is connected to the first electric power line male terminal 312. The extension male connector 310 is connected to the electric power distribution unit 20 or the extension female connector 320 of another extension connector 300 connected to the electric power distribution unit 20. The extension female connector 320 is connected to the extension male connector 310 of the added extension connector 300.

A control microcomputer 330 that is connected to each of a communication line busbar and an electric power line busbar, and a second communication line female terminal 341 and a second electric power line female terminal 342 connected to the control microcomputer 330 are arranged in the main body portion 301. The communication line busbar connects the first communication line male terminal 311 to the first communication line female terminal 321. The electric power line busbar connects the first electric power line male terminal 312 to the first electric power line female terminal 322. The control microcomputer 330 is configured to be capable of executing a control for outputting electric power and communication information to the ECU connector 350 (in other words, the ECU 100 connected to the ECU connector 350) through the second communication line female terminal 341 and the second electric power line female terminal 342 at an appropriate timing. The electric power and the communication information are input into the control microcomputer 330 through the extension male connector 310.

A third communication line female terminal 351 and a third electric power line female terminal 352 are arranged in the ECU connector 350. The ECU connector 350 is configured to be capable of exchanging the communication information with the connected ECU 100 through the third communication line female terminal 351. The ECU connector 350 is configured to be capable of supplying electric power to the connected ECU 100 through the third electric power line female terminal 352.

Application Rearrangement Process

Figure 11:
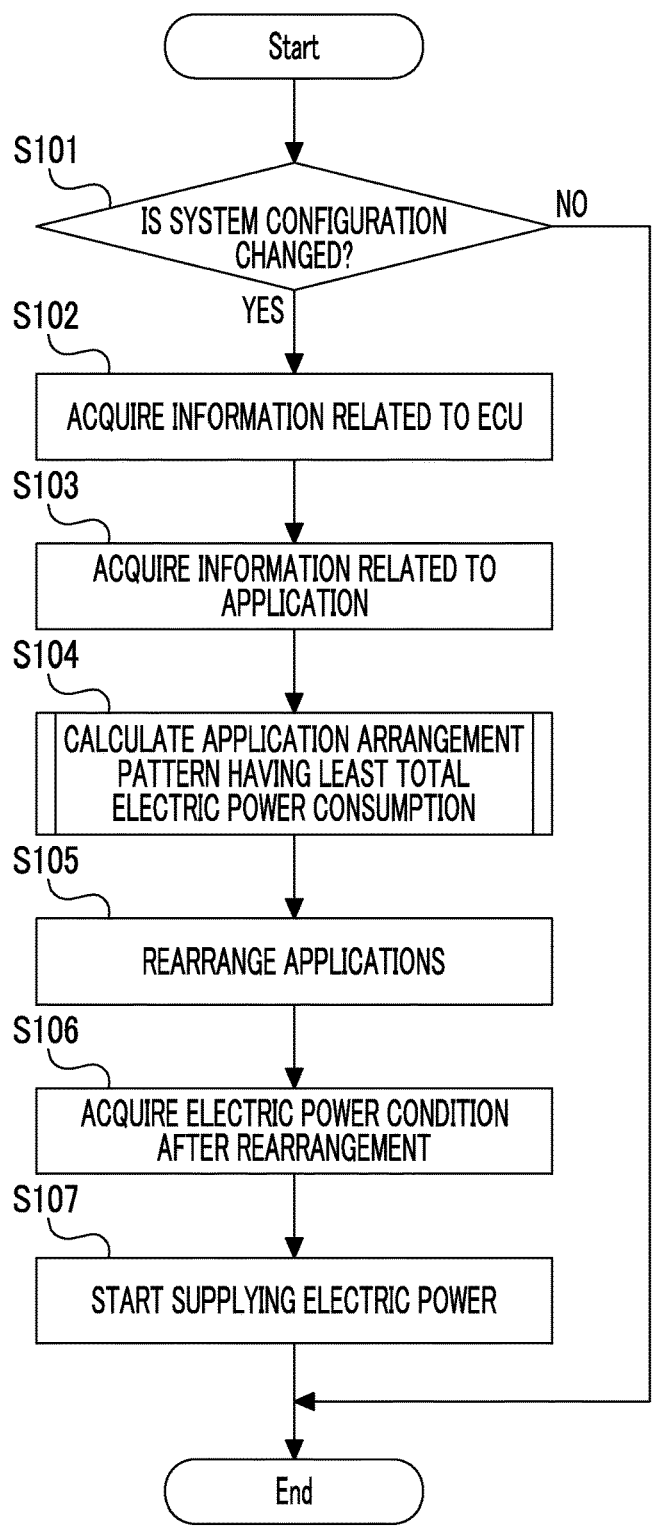
FIG. 11 is a flowchart illustrating a flow of an application rearrangement process of the vehicle system according to the embodiment.

A control for rearranging the applications executed by the vehicle system according to the embodiment will be described in detail with reference to FIG. 11. FIG. 11 is a flowchart illustrating the flow of an application rearrangement process of the vehicle system according to the embodiment. While the process described below is executed by each unit of the electric power control ECU 30 (refer to FIG. 1), a part or the entirety of the process may be configured to be executable by each ECU 100 or other units.

As illustrated in FIG. 11, whether there is a change in system configuration is monitored in the vehicle system according to the present embodiment (step S101). That is, whether there is a new ECU, application, sensor, or the like as described in FIG. 5 to FIG. 7 is monitored. When the system configuration is changed (step S101: YES), the application rearrangement process is started from step S102. When the system configuration is not changed (step S101: NO), subsequent processes are omitted.

When the application rearrangement process is started, the information acquisition unit 31 acquires information related to the ECUs 100 (includes the added ECU 100 when a new ECU 100 is added) included in the vehicle system (step S102). The information related to the ECUs 100 includes at least information indicating the number of ECUs 100 and information indicating the capacity of each ECU 100.

The information acquisition unit 31 acquires information related to the applications (includes the added application when a new application is added) arranged in the ECUs 100 (step S103). The information related to the applications includes at least information indicating the number of applications and information indicating the capacity of each application.

The pattern calculation unit 32 calculates an arrangement pattern that enables the applications to be arranged in the ECUs 100, based on the information related to the ECUs 100 and the information related to the applications acquired by the information acquisition unit 31. Specifically, the pattern calculation unit 32 calculates an arrangement pattern that does not exceed the capacity of each ECU 100, using the information related to the capacity of each ECU 100 and the information related to the capacity of each application. The electric power consumption calculation unit 33 calculates the total electric power consumption of each of a plurality of arrangement patterns calculated in the pattern calculation unit 32, and calculates (determines) the application arrangement pattern having the least total electric power consumption (step S104). The process executed by the pattern calculation unit 32 and the electric power consumption calculation unit 33 will be described in detail below.

The application arrangement processing unit 34 rearranges the applications to implement the calculated application arrangement pattern having the least total electric power consumption (step S105). When the calculated arrangement pattern is the same as the current arrangement pattern, the process of rearranging the applications may be omitted. The process of rearranging the applications may also be omitted when the electric power consumption reduced by rearranging the applications is less than a predetermined value (for example, when the difference between the total electric power consumption of the current arrangement pattern and the total electric power consumption of the arrangement pattern after rearrangement is very small, and rearrangement of the applications does not sufficiently achieve the effect of reducing the total electric power consumption).

The electric power control ECU 30 acquires an electric power condition of each ECU 100 after rearrangement (step S106). That is, the electric power control ECU 30 acquires information indicating a timing at which electric power needs to be supplied to each ECU 100 in accordance with the applications after rearrangement. The electric power control ECU 30 controls the electric power distribution unit 20 to start supplying electric power to each ECU 100 in accordance with the acquired electric power condition (step S107).

Arrangement Pattern Calculation Process

Figure 12:
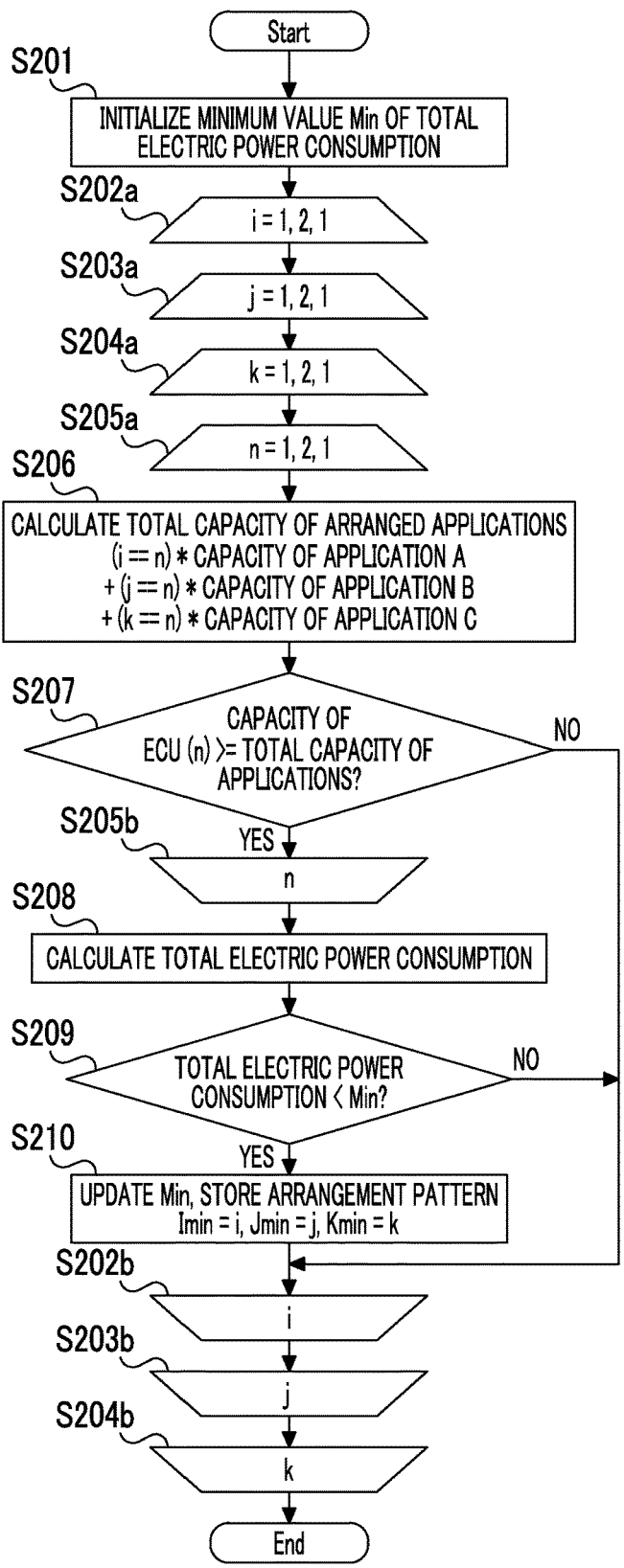
FIG. 12 is a flowchart illustrating a flow of an arrangement pattern calculation process of the vehicle system according to the embodiment.

The process of calculating the arrangement pattern having the least total electric power consumption (that is, the process related to step S104 in FIG. 11) in the application rearrangement process will be described in detail with reference to FIG. 12. FIG. 12 is a flowchart illustrating the flow of an arrangement pattern calculation process of the vehicle system according to the embodiment. Hereinafter, the calculation flow will be described in a case where three applications (A to C) are arranged in two ECUs 100.

As illustrated in FIG. 12, when the arrangement pattern having the least total electric power consumption is calculated, first, a parameter Min that indicates the minimum value of the realizable total electric power consumption is initialized (step S201). The initial value of Min that is set by initialization is assumed to be updated to a less value in the subsequent processes. Thus, the initial value of Min may be set as a sufficiently large value (for example, 1,000 W) with respect to the expected total electric power consumption.

Each process between steps S202a and S202b, between steps S203a and S203b, between steps S204a and S204b, and between steps S205a and S205b is looped in accordance with a predetermined condition. A parameter that indicates the ECU 100 where the application A is arranged is denoted by "i" in steps S202a and S202b. A parameter that indicates the ECU 100 where the application B is arranged is denoted by "j" in steps S203a and S203b. A parameter that indicates the ECU 100 where the application C is arranged is denoted by "k" in steps S204a and S204b. A parameter that indicates the ECU 100 of a calculation target is denoted by "n" in steps S205a and S205b. Numerical values in each step respectively indicate (initial value, termination value, increment). The termination value in each step corresponds to the number of ECUs 100.

Specifically, each process between steps S202a and S202b is looped while the parameter i corresponding to the application A is incremented by one, from one as the initial value to two as the termination value. Each process between steps S203a and S203b is looped while the parameter j corresponding to the application B is incremented by one, from one as the initial value to two as the termination value. Each process between steps S204a and S204b is looped while the parameter k corresponding to the application C is incremented by one, from one as the initial value to two as the termination value. Each process between steps S205a and S205b is looped while the parameter n corresponding to each ECU 100 is incremented by one, from one as the initial value to two as the termination value.

In the loop process, first, the total capacity of the applications arranged in the ECUs 100 is calculated (step S206). The total capacity of the applications can be calculated as "(i==n)*capacity of application A+(j==n)*capacity of application B+(k==n)*capacity of application C". The value of each of (i==n), (j==n), and (k==n) is "1" when i, j, k, and n are the same as each other, and is "0" when i, j, k, and n are different from each other.

A determination as to whether or not the calculated total capacity of the applications is less than or equal to the capacity of each ECU 100 is performed (step S207). When the calculated total capacity of the applications is less than or equal to the capacity of each ECU (step S207: YES), the processes of step S206 and step S207 are repeated until the loop process between steps S205a and S205b is finished. Accordingly, the arrangement pattern that does not exceed the capacities of all ECUs 100 is calculated. When the calculated total capacity of the applications exceeds the capacity of each ECU (step S207: NO), the loop process between steps S205a and S205b is finished, and a subsequent process of calculating the total electric power consumption described below is omitted. The reason is because when the total capacity of the applications exceeds the capacity of each ECU 100, the application arrangement pattern cannot be implemented in actuality, and calculation of the total electric power consumption is meaningless.

When the application arrangement pattern is determined, the total electric power consumption of the determined application arrangement pattern is calculated (step S208). That is, as described using FIG. 2 to FIG. 4, the operating rate of each ECU 100 is determined based on the operating rate of the application that has the highest operating rate among the applications arranged in each ECU 100, and the sum of the electric power consumption of each ECU 100 derived from the operating rate is calculated as the total electric power consumption.

A determination as to whether or not the calculated total electric power consumption is less than the minimum value Min is performed (step S209). When the calculated total electric power consumption is less than the minimum value Min (step S209: YES), a determination can be made that the arrangement pattern of a calculation target currently has the least total electric power consumption. Thus, the minimum value Min is updated to the calculated total electric power consumption, and the parameters i, j, k indicating the arrangement pattern of a calculation target are respectively stored as Imin, Jmin, and Kmin (step S210). When the calculated total electric power consumption is not less than the minimum value Min (step S209: NO), a determination can be made that the arrangement pattern of a calculation target currently does not have the least total electric power consumption. Thus, the process of step S210 is omitted.

By executing such a process for every combination possible, the arrangement pattern that has the least total electric power consumption among implementable application arrangement patterns can be calculated (determined).

Specific Operation Example

Figure 14:
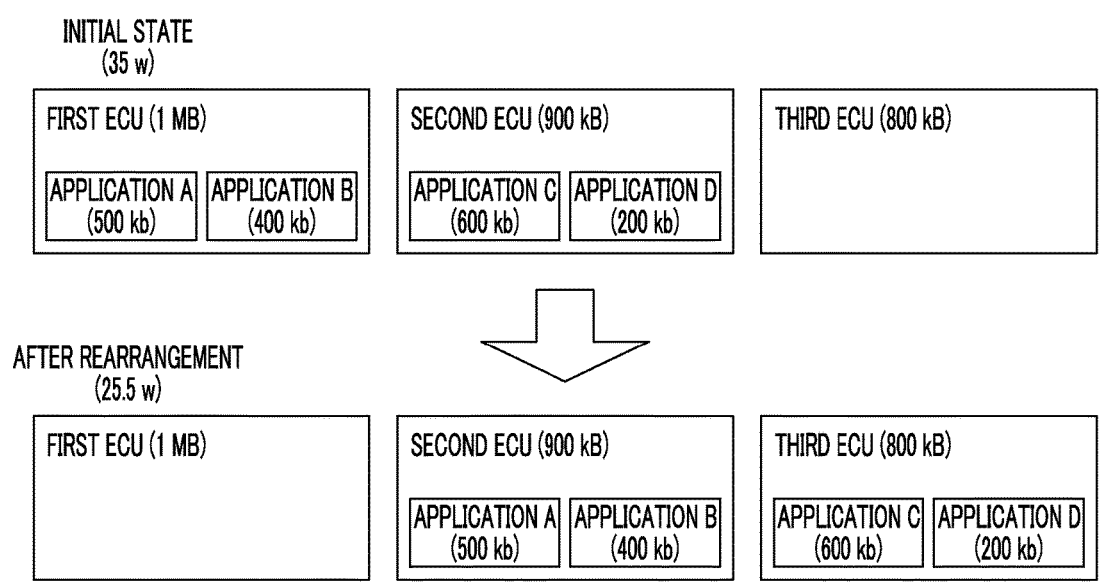
FIG. 14 is a conceptual diagram illustrating an arrangement pattern in an initial state and an arrangement pattern after rearrangement.

A specific operation example when the application rearrangement process is executed will be described with reference to FIG. 13A, FIG. 13B, FIG. 13C and FIG. 14. FIGS. 13A to 13C are tables illustrating one example of arrangement patterns calculated in an arrangement pattern calculation control. FIG. 14 is a conceptual diagram illustrating an arrangement pattern in an initial state and the arrangement pattern after rearrangement.

The arrangement patterns illustrated in FIGS. 13A to 13C are arrangement patterns when the application A (has an operating rate of 100% and a capacity of 500 kB), the application B (has an operating rate of 30% and a capacity of 400 kB), the application C (has an operating rate of 7.5% and a capacity of 600 kB), and the application D (has an operating rate of 25% and a capacity of 200 kB) are arranged in the first ECU 110 (has a rated electric power consumption of 30 W and a capacity of 1 MB), the second ECU 120 (has a rated electric power consumption of 20 W and a capacity of 900 kB), and the third ECU 130 (has a rated electric power consumption of 22 W and a capacity of 800 kB). In the initial state, the application A and the application B are arranged in the first ECU 110, and the application C and the application D are arranged in the second ECU 120. Arrangement patterns that cannot be implemented in terms of capacity are omitted.

When the total electric power consumption in the initial state is compared with the electric power consumptions of the other 18 patterns, it is understood that the pattern 18 has the least total electric power consumption (25.5 W). Thus, each application is rearranged in the arrangement pattern of the pattern 18 in the application rearrangement process.

As illustrated in FIG. 14, before the application rearrangement process is performed, the application A and the application B are arranged in the first ECU 110, and the application C and the application D are arranged in the second ECU 120, while applications are not arranged in the third ECU 130. After the application rearrangement process is performed, the application A and the application B are arranged in the second ECU 120, and the application C and the application D are arranged in the third ECU 130, while applications are not arranged in the first ECU 110. When the applications are rearranged as such, the total electric power consumption of the ECUs 100 is reduced to 25.5 W from the initial state of 35 W. That is, there is a reduction of 9.5 W in electric power consumption before and after rearrangement of the applications.

As described heretofore, the vehicle system according to the present embodiment implements an application arrangement pattern having the least total electric power consumption of the ECUs 100 when the system configuration is changed. Accordingly, the electric power consumption of the entire system can be suitably reduced.

In the above description, the information related to the applications (particularly, the information related to capacity) is used when the arrangement pattern that enables the applications to be arranged in the ECUs 100 is calculated. However, the arrangement pattern that enables the applications to be arranged in the ECUs 100 may be calculated without using the information related to the capacities of the applications. The point is that any method of calculating the arrangement pattern may be used, provided that the arrangement pattern that enables the applications to be arranged in the ECUs 100 is calculated.

The present disclosure is not limited to the embodiment and can be appropriately modified to the extent not departing from the gist or the idea of the disclosure read from the claims and the entire specification. Vehicle systems accompanying such modifications also fall within the technical scope of the present disclosure.

What is claimed is:

1. A vehicle system that includes a plurality of electronic control units, the vehicle system comprising a main control electronic control unit configured to
   acquire an operating rate of each of a plurality of applications arranged in at least one of the electronic control units,
   calculate a plurality of arrangement patterns in which the applications are arranged in the electronic control units,
   calculate, based on the operating rate of each of the applications, a total electric power consumption of the electronic control units when each of the arrangement patterns is implemented, and
   arrange the applications in at least one of the electronic control units in the arrangement pattern that has a least total electric power consumption among the arrangement patterns.

2. The vehicle system according to claim 1, wherein the main control electronic control unit is configured to calculate the arrangement patterns when a new electronic control unit is added to the vehicle system.

3. The vehicle system according to claim 1, wherein the main control electronic control unit is configured to calculate the arrangement patterns when a new application is added to the vehicle system.

4. The vehicle system according to claim 1, wherein the main control electronic control unit is configured to calculate the arrangement patterns when a new output unit configured to output information to be used by an application arranged in the electronic control units is added to the vehicle system.

5. The vehicle system according to claim 1, wherein the main control electronic control unit is configured to learn and update the operating rate of each of the applications.

6. The vehicle system according to claim 5, wherein the main control electronic control unit is configured to monitor the operating rate of each of the applications and appropriately update the operating rate.

7. A vehicle system comprising:
   an electric power distribution unit;
   a battery that is connected to the electric power distribution unit;
   a main control electronic control unit that is connected to the electric power distribution unit; and
   a plurality of electronic control units that is connected to the electric power distribution unit, wherein:
   the electric power distribution unit is configured to supply electric power of the battery to the electronic control units and the main control electronic control unit; and
   the main control electronic control unit is configured to
      acquire an operating rate of each of a plurality of applications arranged in at least one of the electronic control units,
      calculate a plurality of arrangement patterns in which the applications are arranged in the electronic control units,
      calculate, based on the operating rate of each of the applications, a total electric power consumption of the electronic control units when each of the arrangement patterns is implemented, and
      arrange the applications in at least one of the electronic control units in the arrangement pattern that has a least total electric power consumption among the arrangement patterns.

* * * * *